March 15, 1966   L. E. PENNINGTON ETAL   3,240,512
WEIGHT MEANS FOR UNDERWATER PIPE LINES
Original Filed Feb. 23, 1961   2 Sheets-Sheet 2

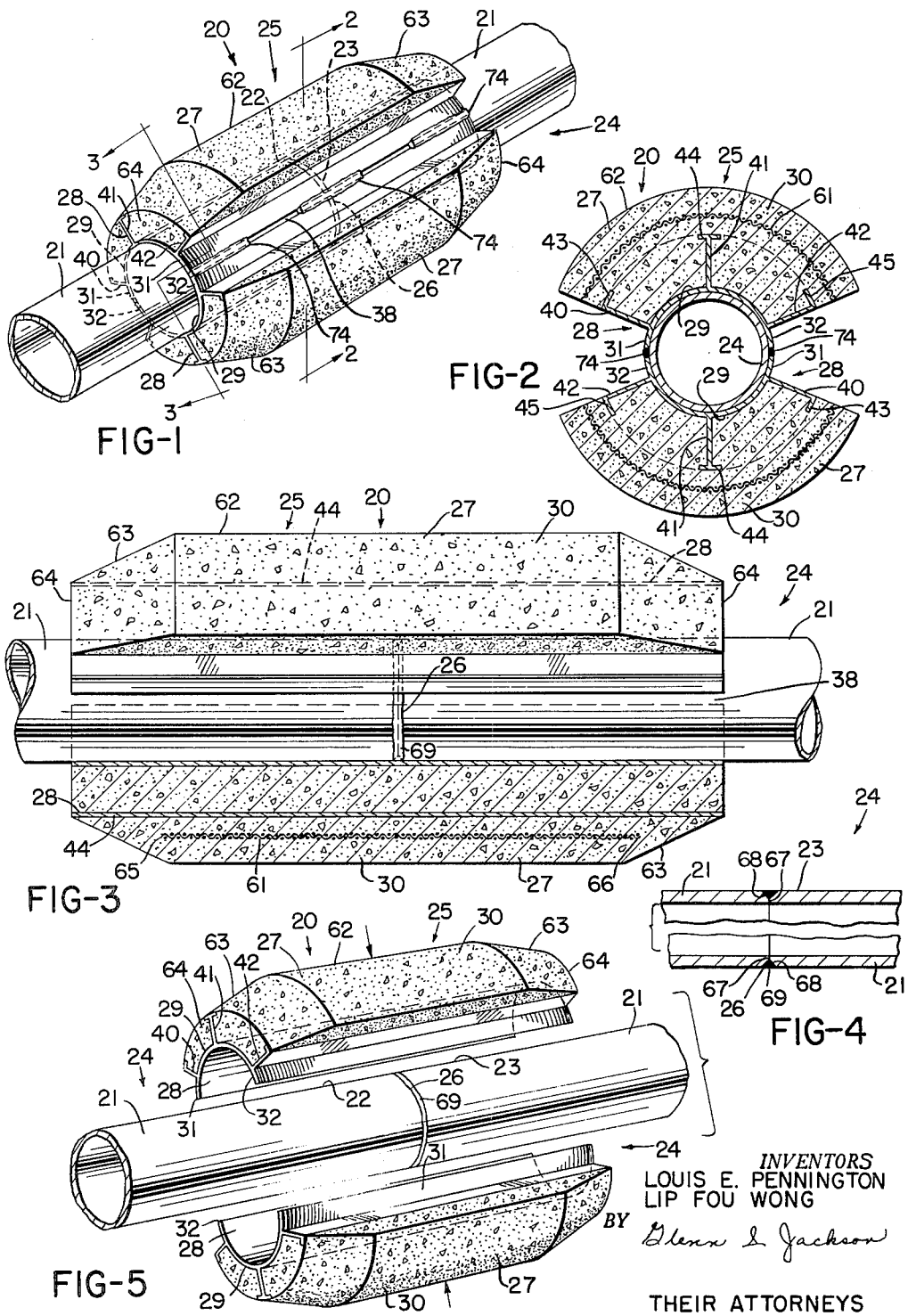

INVENTORS
LOUIS E. PENNINGTON
LIP FOU WONG
BY
THEIR ATTORNEYS 3,240,512
WEIGHT MEANS FOR UNDERWATER
PIPE LINES
Louis E. Pennington, Chesterfield County, and Lip Fou Wong, Henrico County, Va., assignors to Reynolds Metals Company, Richmond, Va., a corporation of Delaware
Continuation of application Ser. No. 91,206, Feb. 23, 1961. This application Oct. 26, 1964, Ser. No. 407,621
3 Claims. (Cl. 285—45)

This application is a continuation of Serial No. 91,206, filed February 23, 1961 and now abandoned.

This invention relates to improved conduit or pipe line constructions and to the methods of making the same or the like. This invention also relates to improved weights and/or couplers for forming such conduit constructions and to improved methods for making such weights or the like.

It is well known in the pipe line art that in order to lay pipes or conduits beneath bodies of water, such as lakes and the like for transporting oil, gas and the like across the body of water, the conduits or pipe lines are formed by butt-welding or otherwise securing together adjacent ends of adjacent conduit sections and thereafter sinking and anchoring such interconnected conduit sections to the bottom of the body of water by attaching weights to the interconnected conduit sections.

Such conduit or pipe line constructions are normally formed of steel whereas aluminum-containing metal is a more desirable material for such purpose because the same is light weigtht and non-corrosive. However, in the past, more time was required to install aluminum pipe lines than was required to install steel pipe lines. Further, aluminum pipe lines are more frequently damaged by boat anchors dragging near the bottom of the body of water because the joints of prior known aluminum pipe lines were deficient in strength and easily broken. Also, the weights attached to aluminum pipe lines readily fell off causing parts of the aluminum pipe line to float upwardly and be more susceptible to anchor grab and damage.

Accordingly, it is one of the features of this invention to provide improved methods and structures for joining together adjacent conduit sections and the like to provide improved conduit or pipe line constructions whether the same are made of aluminum-containing metal or other materials.

Another feature of this invention is to provide improved methods and structures for weighting such conduit or pipe line constructions whether the same are formed of aluminum-containing metal or other materials.

In particular, one conduit construction of this invention comprises a plurality of conduit sections having adjacent ends thereof secured together to form an elongated conduit and provide a plurality of peripheral seams along the length of the conduit. A plurality of weights are disposed along the conduit with each weight spanning a particular peripheral seam of the conduit and being secured directly to the adjacent pair of conduit sections defining that particular seam whereby the weights rigidify the seams of the conduit and weight said conduit. In this manner, a relatively rigid and durable conduit construction is provided which will be anchored by the weights against the bottom of a body of water.

Each weight of this particular conduit construction comprises a plurality of base means respectively carrying weight means, such as concrete and the like, and respectively having saddle portions disposed about the conduit and spanning the particular seam to be rigidified by the weight. Each saddle portion of each base means has a pair of opposed end flanges extending beyond the respective weight means thereof and being spaced from the end flanges of adjacent base means. Each end flange is secured directly to the conduit sections defining the seam spanned thereby and is also secured to an adjacent end flange of an adjacent base means whereby the interconnected base means rigidify that particular seam of the conduit and the weight means thereof weight the conduit to provide a negative buoyancy of the conduit.

Therefore, the weights of this invention not only provide improved joint structure for the particular conduit, but the same also are secured to the conduit in such a manner that the weights will not become detached therefrom as in prior-known constructions.

Accordingly, it is an object of this invention to provide an improved conduit construction having one or more of the novel features set forth above or hereinafter shown or described.

Another object of this invention is to provide an improved method for making such a conduit construction or the like.

A further object of this invention is to provide an improved weight and/or coupler for such a conduit construction or the like.

Another object of this invention is to provide an improved method for making such a weight or the like.

Other objects, uses and advantages of this invention are apparent from a reading of this description which proceeds with reference to the accompanying drawings forming a part thereof and wherein:

FIGURE 1 is a fragmentary, perspective view of one of the conduit constructions of this invention.

FIGURE 2 is an axial cross-sectional view of the conduit construction illustrated in FIGURE 1 and is taken on line 2—2 thereof.

FIGURE 3 is a side view of the conduit construction illustrated in FIGURE 1 and is taken on line 3—3 thereof to illustrate the same partially in elevation and partially in cross-section.

FIGURE 4 is a fragmentary, cross-sectional view illustrating one method for securing together adjacent ends of the adjacent conduit sections.

FIGURE 5 is a perspective view similar to FIGURE 1 and illustrates one of the initial steps in the method for securing the weight of this invention to the conduit construction of FIGURE 4.

Figure 6:
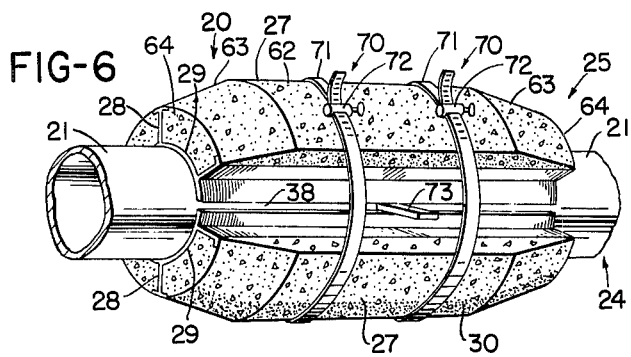
FIGURE 6 is a view similar to FIGURE 5 and illustrates another step in the method for securing the weight of this invention to the conduit construction of FIGURE 4.

While the various features of this invention are hereinafter described as being particularly adaptable for forming conduit constructions from conduit sections formed of aluminum-containing metal or the like, it is to be understood that the features of this invention are equally applicable to forming conduit constructions formed of any other desired material, such as steel and the like. Therefore, the features of this invention are not to be limited only to aluminum-containing conduit constructions.

Referring now to FIGURE 1, an improved conduit or pipe line construction of this invention is generally indicated by the reference numeral 20 and comprises a plurality of hollow conduit sections 21 secured together in aligned relation at adjacent ends 22 and 23 thereof to provide an elongated conduit 24 carrying a weight of this invention generally indicated by the reference numeral 25, the weight 25 not only weighting the conduit construction 20 to provide a negative buoyancy thereof, but also rigidifying the conduit peripheral seam 26 spanned thereby and defined by the secured ends 22 and 23 of the conduit sections 21.

Therefore, the weights 25 not only rigidify the seams or joints 26 of the conduit construction 20 in a manner hereinafter described, but the weights 25 also provide a negative buoyancy thereof and are secured thereto in a manner hereinafter described whereby the weights 25 are firmly fastened to the conduit 24 and cannot be readily dislodged therefrom whether the conduit sections 21 are formed of aluminum-containing metal or not.

Each weight 25 of this invention comprises one or more weight sections 27 secured to the conduit 24 and spanning a particular peripheral seam 26 thereof, the weights 25 of the conduit construction 20 including two weight sections 27.

Each weight section 27 comprises a metal base member or base means 28 having an arcuate saddle portion 29 for encompassing and engaging the conduit 24 on one side thereof and carrying suitable weight means 30 on the other side thereof. The saddle portion 29 has a pair of opposed end flanges 31 and 32 extending beyond the weight means 30 to be directly secured to the conduit 24 in a manner hereinafter described to permanently secure the weight section 27 to the conduit 24 to not only rigidify the particular peripheral seam 26 of the conduit 24 spanned by the weight section 27, but to also weight the conduit 24 to provide a negative buoyancy thereof.

Figure 7:
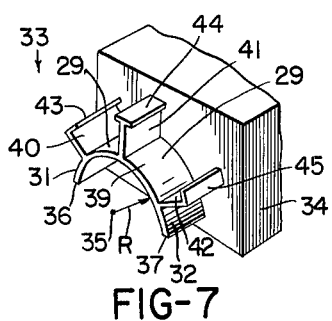
FIGURE 7 is a schematic, perspective view illustrating one of the methods for forming the base members of the weight of this invention.

The base members or means 28 can be formed of any suitable material and in any suitable manner, and, in the embodiment illustrated in the drawings, the base members 28 are respectively cut from a length of base member stock 33, FIGURE 7, formed of aluminum-containing metal and extruded by a conventional extruding apparatus 34 in a manner well known in the art.

The extruded stock 33 is extruded in such a manner that the arcuate saddle portion 29 thereof extends throughout the length thereof and is defined by a radius R generated about a point 35 spaced outwardly from a plane passing through the free ends 36 and 37 of the opposed end flanges 31 and 32 of the arcuate saddle portion 29. The radius R is of substantially the same length as a radius which will generate the outer peripheral surface of a particular conduit to be utilized with the stock 33 so that the concave side of saddle portions 29 of the base members 28 subsequently cut from the base member stock 33 will snugly encompass and engage the outer peripheral surface of the conduit utilized therewith.

Since the base member stock 33 is utilized to form the base members 28 of the weight 25 illustrated in FIGURES 1–9, wherein only two weight sections 27 are utilized to form the weight 25, the generating point 35 of the radius R defining the saddle portion 29 of the extruded base member stock 33 is only slightly spaced outwardly from the plane passing through the free ends 36 and 37 of the opposed end flanges 31 and 32 thereof. In this manner, the resulting base members 28 cut from the stock 33 and disposed about the conduit 22 in the opposed relation illustrated in FIGURES 1 and 2 will have the adjacent pairs of opposed end flanges 31, 31 and 32, 32 thereof slightly spaced from each other to define a narrow longitudinal channel 38 therebetween for at purpose hereinafter described.

The convex side 39 of the saddle portion 29 of the extruded base member stock 33 has a plurality of reinforcing flanges 40, 41 and 42 extending outwardly therefrom and being integrally interconnected thereto. The reinforcing flanges 40–42 of the embodiment illustrated in the drawings are disposed substantially radially from the point 35 with the reinforcing flanges 40 and 42 being disposed inboard of the respective ends 36 and 37 of the end flanges 31 and 32 of the saddle portion 29, and the intermediate reinforcing flange 41 is disposed substantially equidistant between the outermost reinforcing flanges 40 and 42.

The reinforcing flanges 40–42 respectively carry integrally connected transverse webs 43, 44 and 45 at the outer ends thereof to provide tying means for the weight means 30 in a manner hereinafter described. The transverse webs 43 and 45 of the reinforcing flanges 40 and 42 extend only from the inboard sides thereof toward the intermediate reinforcing flange 41 to define L-shaped cross-sectional configurations whereas the transverse web 44 of the intermediate reinforcing flange 41 extends from both sides thereof to provide a substantially T-shaped cross-sectional configuration.

While the dimensions of the extruded base member stock 33 can vary as desired, it has been found that when the conduit sections 21 of the conduit construction 20 have an outside diameter of approximately 4.500 inches, the radius R generating the saddle portion 29 of the extruded base member stock 33 should be approximately 2.250 inches. The reinforcing flanges 40 and 42 are disposed at acute angles of approximately 22½° relative to a plane passing through the point 35 and disposed parallel to a plane passing through the ends 36 and 37 of the opposed end flanges 31 and 32 of the saddle portion 29 of the extruded base member stock 33, while the intermediate reinforcing flange 41 is disposed substantially perpendicularly to those planes. The reinforcing flanges 40–42 each has a length of approximately 2.000 inches, and the length of each transverse tying web 43–45 thereof is approximately 0.750 of an inch. While the thickness of the saddle portion 29 and flanges 40–42 can vary, it has been found satisfactory to form the same with a thickness of approximately 0.100 of an inch for this particular sized extruded base member stock 33.

After the base member stock 33 has been formed in the above manner, the individual base members or means 28 are cut therefrom in desired lengths. For example, when the conduit sections 21 have the joining ends 22 and 23 thereof provided with an outside diameter of approximately 4.500 inches and normally provided with a 4.000 inch inside diameter and hereinafter referred to as a four-inch conduit or pipe line section, the individual base members 28 have a length of approximately 24 inches.

Figure 8:
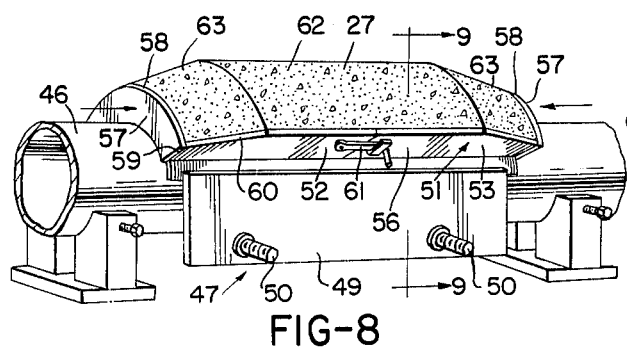
FIGURE 8 is a perspective view illustrating one of the methods and apparatus for securing the weight means of this invention to one of the base members formed from the extruded stock illustrated in FIGURE 7.
Figure 9:
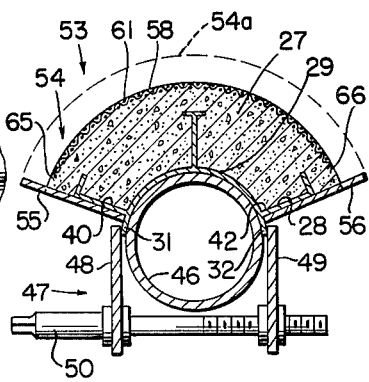
FIGURE 9 is a cross-sectional view taken on line 9—9 of FIGURE 8 and illustrates one of the intermediate steps in the method of securing the weight means of this invention to one of the base members.

After the base members 28 have been cut from the base member stock 33, each weight section 27 is formed therefrom in any desired manner, one such method and apparatus of this invention being illustrated in FIGURES 8 and 9.

In particular, each base member 28 has the saddle portion 29 thereof disposed over a supported mandrel 46 having substantially the same outside diameter as the particular conduit 24 to be utilized therewith. For example, the mandrel 46 can comprise a cut length of a conduit section 21, if desired. The opposed end flanges 31 and 32 of the base member 28 are firmly clamped or otherwise temporarily held against the outer peripheral surface of the mandrel 46 to hold the saddle portion 29 in its selected configuration during the weight means attaching operation. For example, the opposed end flanges 31 and 32 of the base means 28 are held in fixed relation against the outer peripheral surface of the mandrel 46 by a clamping device 47. The clamping device 47 comprises a pair of relatively movable jaws 48 and 49 carried by interconnecting means 50 which, when rotated in a particular direction, move the jaws 48 and 49 toward each other to compact the end flanges 31 and 32 of the base member 28 in stacked relation against the outer peripheral surface of the mandrel 46 to hold and maintain the saddle portion 29 of the base means 28 in the desired arcuate configuration.

After the base means 28 has been clamped to the mandrel 46 by the clamping device 47 or by any other suitable clamping device or holding means, a mold device 51 is interconnected to the base means 28 and comprises a pair of identical mold sections 52 and 53 respectively telescoped over the opposed ends of the base member 28 to define a mold chamber 54 with the convex surface 30 of the saddle portion 29 of the base member 28. Each mold section 52 and 53 includes a pair of outwardly directed and angularly disposed side boards 55 and 56 interconnected at one end thereof by an end plate 57, the side boards 55 and 56 being adapted to be disposed in sliding relation with the outboard sides of the reinforcing flanges 40 and 42 of the base member 28 in the manner illustrated in FIGURE 9 with the end plate 57 thereof disposed flush against the respective ends of the reinforcing flanges 40-42 and the saddle portion 29. The end plate 57 has the top surface 58 thereof arcuately shaped and extending to the transverse webs 43-45 of the reinforcing flanges 40-42. The end edges of the side boards 55 and 56 of each mold section 52 and 53 is divided into two portions in the manner illustrated in FIGURE 8 whereby the lower portions 59 thereof are disposed substantially perpendicularly to the mandrel 46 with the outer portions 60 thereof sloping backwardly toward the other mold section 52 or 53 at a desired angle for a purpose hereinafter described. The assembled mold sections 52 and 53 can be interconnected about the base member 28 by suitable fastening means 91 to hold the same in the position illustrated in FIGURE 8 and can have the inside surfaces thereof lined or coated with suitable material which will resist any tendency for the weight means 30 cast therein from being secured thereto. Alternately, the entire mold device 21 can be formed of such nonadhering material, if desired.

After the molding device 51 has been secured to the clamped base member 28 in the above manner, suitable weight material 30, such as concrete or the like, is poured into the mold chamber 54 thereof in the manner illustrated in FIGURE 9 to a desired height whereby an arcuately-shaped reinforcing member 61 is placed thereon. Thereafter, additional mold material 30 is poured on top of the reinforcing member 61 until the cavity 54 is completely filled with the weight material 30 to the level of the dotted line 54a in FIGURE 9. The non-set weight material 30 is subsequently troweled or otherwise suitably formed to provide an outer arcuate surface 62 having beveled end portions 63 in the manner illustrated in FIGURE 8, the edges 58 of the end plates 57 and the edge portions 60 of the side boards 55 and 56 defining part of the perimeters of the beveled ends 63 of the weight material 30.

After the mold material 30 has hardened and become firmly secured to the base member 28 and tied thereto by the tying webs 43-45, the clamping device 47 and mold device 51 are removed from the base member 28 whereby a particular weight section 27 has been completely formed.

It has been found desirable to clamp the base member 28 of each weight section 27 to the mandrel 46 or other suitable structure during such weight casting operation in order to assure that the saddle portion 29 thereof will have a desired cross-sectional configuration after the mold material 30 has set and hardened. However, it is to be understood that the mold material 30 may be cast to the base member 28 before the same is clamped to the mandrel 46 as long as the base member 28 is clamped thereto before the weight material 30 sets and tends to permanently draw the saddle portion 29 out of its selected configuration.

While the weight material 30 can be formed of any desired material, it has been found that a concrete having a high density, heavy aggregate grout with a density in the order of 205-215 per cubic foot performs satisfactorily. Such concrete is known commercially as "Barite."

While the particular shape and size of the weight means 30 of each weight section 27 can vary as desired, it has been found that when the particular weight section 27 is being utilized with the afore-mentioned four-inch conduit 24, the arcuate outer peripheral surface 62 can extend approximately 3.750 inches above the saddle portion 29. The weight means 30 has a minimum bumper shoulder 64, FIGURE 1, of approximately 0.750 of an inch and beveled end portions 63 disposed at angles of at least 25° relative to the outer arcuate surface 62 thereof.

The reinforcement 61 can be formed of any suitable material, and, in the embodiment illustrated in the drawings, the reinforcing member 61 comprises a two-inch by #10 gauge steel reinforcing mesh previously bent into arcuate form and preferably located at a minimum of 1½ inches below the outside concrete surfaces at all points of the weight means 30 and, preferably, not over two inches therefrom. Preferably, the reinforcing member 61 extends the entire length of the weight means 30 to within 1½ inches of either end thereof. While the ends 65 and 66 of the reinforcing member 61 illustrated in FIGURE 9 do not extend to the side boards 55 and 56 of the molding device 51, it is to be understood that the same can extend thereto so as to be disposed in the position illustrated in FIGURE 2 when a particular weight section 27 is formed therefrom in the above manner.

Each weight section 27 is formed in the above manner either at the location of the conduit laying operation or remote therefrom and shipped to the conduit laying location to be subsequently interconnected to the conduit 24 in a manner hereinafter described.

While the elongated conduit 24 can be formed from a plurality of conduit sections 21 formed in any suitable manner, it is preferred to utilize heavy ended aluminum-containing conduit sections each having a length of approximately forty feet. For example, it is well known in the conduit and pipe line art that conduit sections are provided commercially having thickened walls at the opposed ends thereof whereas the major portion of the conduit sections have relatively thin walls whereby the heavy ends thereof can provide joint structures of desired strengths without requiring that the entire length of the conduit sections be provided with a wall thickness corresponding to the ends thereof. Therefore, a savings in material of approximately 27% is provided by heavy end pipes or conduit sections over conventional conduit sections having uniform wall thickness throughout their entire lengths.

A typical four-inch, forthy-foot heavy end conduit section 21 formed of 6061-T6, 6062-T6 or 5083-H112 aluminum alloy has heavy ends of approximately 11 inches long and a wall thickness of approximately 0.237 of an inch whereas the major portion of the conduit section has a wall thicknes of approximately 0.163 of an inch.

The elongated conduit 24 is formed by serially interconnecting adjacent ends of adjacent conduit sections 21 together in aligned relation, the conduit sections 21 being the afore-mentioned heavy end aluminum-containing conduit sections or conventional conduit sections formed of steel, aluminum or the like, as desired.

In particular, each end 22 and 23 of the conduit sections 21 is formed with inwardly disposed flat land 67 and an outwardly disposed beveled surface 68, the conduit sections 21 either being originally provided with the lands 67 and beveled surfaces 68 or having the same formed in a manner well known in the art at the conduit forming and laying location. The lands 67 of adjacent ends 22 and 23 of adjacent conduit sections 21 abut each other in the manner illustrated in FIGURE 4 and the ends 22 and 23 are secured together by a weld 69 that interconnects the beveled surfaces 68 together and has the outer surface thereof disposed flush with the outer surface of the conduit sections 21 to define the peripheral seam 26 previously mentioned.

No crown reinforcement of the weld 69 is provided because any bending and tensile stresses across the butt welded seam 26 is borne by the weight 25 spanning the same in a manner hereinafter described.

When the aforementioned four-inch conduit sections 21 are utilized, it has been found that the flat lands 67 thereof should be approximately $\frac{1}{16}$ of an inch, with the beveled surfaces 68 thereof disposed at an angle of approximately 45° relative to the lands 67 when the weld 69 is formed by automatic welding machinery which normally requires a maximum of three passes around the four-inch pipe. It has been found, however, that the beveled surfaces 68 should be disposed at approximately 60° relative to the lands 67 when the weld 69 is formed by hand, using the inert gas shield metal arc welding method well known in the art.

After the adjacent ends 22 and 23 of adjacent conduit sections 21 have been welded together, in the manner illustrated in FIGURE 4, a pair of weight sections 27 are disposed about the resulting conduit 24 in the manner illustrated in FIGURE 5 whereby the saddle portions 29 thereof span the well seam 26 of the conduit 24 and are disposed oppositely relative to each other. Preferably, the weight sections 27 are clamped to the conduit 24 in the manner illustrated in FIGURE 6 to assure a close fit between the saddle portions 29 of the weight sections 27 and the outer peripheral surface of the conduit 24. Such clamps can comprise the conventional come-along clamps 70 each having an elongated strap 71 looped about the weight sections 27 and being progressively tightened therearound by suitable fastening means 72 either manually or hydraulically in a manner will known in the art to hold the weight sections 27 in intimate contact with the conduit 24 during the subsequent weight securing operation. However, it is obvious that other types of clamping means or holding devices can be utilized for this purpose, if desired.

During the clamping operation of the weight sections 27 to the conduit 24, suitable gapping tools 73 can be utilized to assure the proper spacing 38 between adjacent end flanges 31, 32 and 31, 32 of the weight sections 27 to permit the adjacent pair of end flanges 31, 32 and 32, 32 not only to be secured to each other but also to the conduit 24 in the following manner.

The clamping means 70 are so arranged relative to the weight sections 27 that each end flange 31 and 32 thereof can be welded directly to the conduit sections 21 of the conduit 24 and to the adjacent end flange 31 or 32 of the adjacent weight section 27 by a plurality of longitudinally disposed skip welds 74 in the manner illustrated in FIGURES 1 and 2. Preferably, two groups of three skip welds 74 are utilized when the weight sections 27 are being interconnected to the afore-mentioned four-inch conduit sections, each skip weld 74 being approximately four to five inches long with one of the skip welds 74 of each group thereof crossing the weld seam 26 of the conduit 24.

Preferably, the weight sections 27 are secured to the conduit 24 by the clamping means 70 with one weight section 27 disposed vertically over the other weight section 27 so that the welding operator can approach both pairs of opposed end flanges 31, 32 and 31, 32 to effect the welding operation thereof without turning the conduit 24.

By welding or otherwise securing each base member 28 of the weight 25 directly to the conduit 24, as well as to the other base member 28 thereof, the weight 25 formed thereby cannot shift axially along the conduit 24 in the manner provided by the prior-known weight constructions. Further, since the base members 28 of the weight 25 span the peripheral seam 26 thereof, the weight 25 rigidifies the seam 26 to provide an improved conduit joint not provided by prior-known instructions.

For example, it has been found that when the conduit construction 20 is formed of a plurality of aluminum-containing conduit sections 21, the weights 25 are not only adequately secured thereto so that the same will not fall off as in prior-known constructions, but also the weights strengthen the conduit joints 26 in such a manner that the resulting conduit construction 20 is far superior to prior-known conduit constructions even when the same are formed of steel and the like.

In particular, in a long-string pick-up test in which 300-foot strings of aluminum conduit sections interconnected by the weights of this invention and a 300-foot string of butt welded steel pipe were picked up simultaneously, failure of the steel pipe occurred in cracking of the weld bead at a 57-foot elevation whereas the aluminum conduit construction failed in buckling of the conduit section at 61 feet when the aluminum pipe was formed of aluminum alloy 6061–T6 and at 79 feet when the pipe was formed of aluminum alloy 5083–H112. Thus, when forming an aluminum conduit or pipe line construction according to the teachings of this invention, the conduit itself failed bfeore the joints thereof.

In jib-binding tests, in which a back-breaking load was applied to the pipe joint across a 40-foot span with end hold-down rollers, all aluminum pipe failures occurred at points other than at the pipe joint which was located at the mid-span thereof.

In a direct tension test, the butt weld seam 26 of a conduit construction 20 formed of aluminum alloy 6061–T6 heavy end pipe failed at 131,900 pounds tension. However, since the computed tensile breaking load of the thinner wall of the conduit body is only 117,000 pounds in direct tension, the weight-reinforced butt welded seam 26 exceeds that of the pipe body itself thereby eliminating the joints of the conduit construction 20 from consideration in tension as well as in bending computation.

There is also evidence that the weights 25 improve the bursting pressure of the butt weld seams 26.

Accordingly, it can be seen that the methods and structures of this invention overcome the prior known disadvantages of utilizing aluminum-containing metal conduits for pipe line or conduit constructions that are to be disposed across the bottom of a body of water, the methods and structures of this invention not only increasing the strength of the joints of the conduits for pipe lines, but the same also adequately secures the weighting medium thereto in such a manner that the weights cannot shift axially relative to the conduit and cannot be accidentally dislodged therefrom to permit part of the pipeline to float upwardly and be subject to damage by anchorage dragging and the like, as in prior-known constructions.

While the conduit construction 20 may be formed in any desired sequence during the laying operation thereof, two such methods have been tested and proved adequate, whereas it is obvious that other methods may be also utilized.

Figure 11:
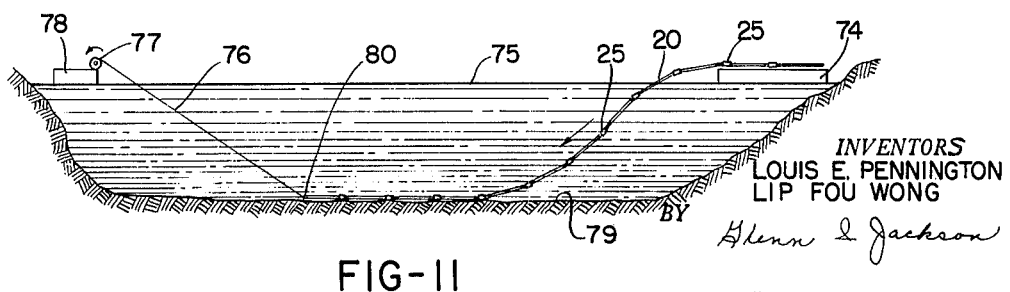
FIGURE 11 is a schematic view illustrating one method of laying one of the conduit constructions of this invention across the bottom of a body of water.

For example, as illustrated in FIGURE 11, the conduit construction 20 is formed on a barge 74 or the like, anchored on the particular body of water 75 at one of the terminal points of the pipe line or conduit construction. As each conduit section 21 is secured to the pipe line construction 20, a weight 25 is secured thereto at the resulting seam 26, and, thereafter, the conduit construction 20 is pulled toward the other terminal point of the pipe line by a cable 76 of a winch 77 caried on another barge 78 anchored at that terminal point of the conduit construction 20. As the conduit construction 20 is drawn from the conduit construction-forming barge 74, additional conduit sections 21 are secured thereto, together with the interconnected weights 25, so that the conduit construction 20 is progessively drawn across the bottom 79 of the body of water 75 by the winch 77. The end 80 of the conduit construction 20 is closed by suitable flanging means before the dragging operation thereof across the bottom 79 of the body of water 75 and the streamlined configuration of the individual weight sections 27, provided by the flat ends 64 and beveled surfaces 63 thereof, permit the weights 25 to be dragged across the bottom 80 of the body of water 75 without spalling or otherwise cracking of the cement weights 30 thereof.

An alternate method of forming the pipe line construction 20 would be to form various lengths thereof on land and, thereafter, tow the same out into the body of water and interconnect those lengths together to form the conduit construction 20 across the body of water 75.

While the conduit construction 20 is illustrated as having the weights 25 thereof secured solely at the joints 26 of the conduit 24, it is to be understood that the weights 25 could also be secured along the conduit 24 at places other than at the seams 26 thereof to perform solely the weighting function. However, when the weights 25 are secured to the seams 26 of the conduit 24, the weights 25 not only provide negative buoyancy for the conduit 22 but also reinforce the seams 26 in the manner previously described.

Figure 10:
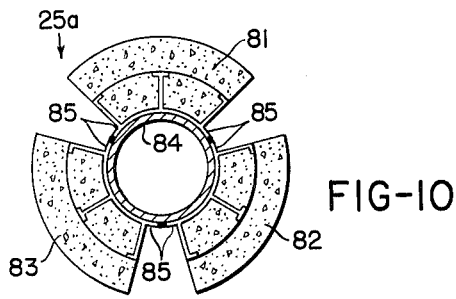
FIGURE 10 is a view similar to FIGURE 2 and illustrates another embodiment of this invention.

While the weights 25 have been illustrated as being formed of a pair of weight sections 27, it is to be understood that a single weight section 27 can be utilized, if desired. Further, more than two weight sections 27 can be utilized to form the weight 25 in the manner illustrated in FIGURE 10.

In particular, the weight 25a comprises three weight sections 81, 82, and 83 secured to a conduit 84, either at the seam thereof or anywhere along the length thereof. Each weight section 81, 82, or 83 has each opposed end flange 85 of the saddle portion thereof secured directly to the conduit 84 and to an adjacent end flange 85 of an adjacent weight section in the same manner as the weight 25 previously described.

Therefore, one or more weight sections can be utilized to form the weights of this invention.

Since it has been found that a dry weight of 165 pounds must be provided for each forty-foot length of the aforementioned four-inch heavy end aluminum conduit sections 21 to provide a 5% negative buoyancy for the evacuated conduit construction 20, the weights 25 or 25a for each peripheral seam 26 thereof must weight at least 165 pounds whether formed of one or more weight sections. However, if the weights 25 or 25a do not weight 165 pounds, additional weight sections can be attached to the conduit construction 20 at points other than the seams 26 thereof to provide the desired degree of negative buoyancy, and this invention is not to be limited to any particular weight for each weight section thereof, as the length of the conduit sections 21 or weight sections can vary, as desired.

Accordingly, it can be seen that this invention provides an improved conduit or pipe line construction as well as an improved method of making the same or the like. Further, this invention provides an improved weight or coupler for such a conduit construction or the like as well as an improved method of making such a weight or the like.

What is claimed is:

1. In combination, a metal conduit having an outer peripheral surface, and a plurality of opposed metal base means respectively carrying concrete weights to weight said conduit and respectively having saddle portions encompassing and engaging part of said peripheral surface of said conduit, said saddle portions of said base means each having a pair of opposed end flanges extending beyond said weight thereof and being spaced from adjacent end flanges of adjacent base means, each end flange of each base means being secured by welding directly to said conduit and to the adjacent flange of an adjacent base means, said saddle portions of said base means each having outwardly directed longitudinal flanges disposed inboard of said end flanges and confining said weight therebetween at an area removed from the area of the weld whereby said concrete weights are removed from the heat of the weld.

2. In combination, a conduit having an outer peripheral surface, and a plurality of base means respectively carrying weight means to weight said conduit and respectively having saddle portions encompassing and engaging part of said peripheral surface of said conduit, said saddle portions of said base means each having a pair of opposed end flanges extending beyond said weight means thereof and being spaced from adjacent end flanges of adjacent base means, each of said end flanges being secured by welding directly to said conduit and to the adjacent flange of an adjacent base means, said saddle portions of said base means each having outwardly directed longitudinal flanges disposed inboard of said end flanges and confining said weight therebetween at an area removed from the area of the weld whereby said weight means are removed from the heat of the weld.

3. In combination, a conduit having an outer peripheral surface and including a pair of sections secured together at adjacent ends thereof to provide a peripheral seam of said conduit, and a plurality of base means respectively carrying weight means to weight said conduit and respectively having saddle portions encompassing and engaging part of said peripheral surface of said conduit and spanning said seam thereof, said saddle portions of said base means each having a pair of opposed end flanges extending beyond said weight means thereof and being spaced from adjacent end flanges of adjacent base means, each of said end flanges being secured by welding directly to said conduit and to the adjacent end flange of an adjacent base means, said saddle portions of said base means each having outwardly directed longitudinal flanges disposed inboard of said end flanges and confining said weight means therebetween at an area removed from the area of the weld whereby said weight means are removed from the heat of the weld.

References Cited by the Examiner

UNITED STATES PATENTS

| | | | |
|---|---|---|---|
| 318,925 | 5/1885 | Patterson | 285—45 |
| 1,345,543 | 7/1920 | Huth | 285—286 |
| 1,442,160 | 1/1923 | Lachman | 138—175 |
| 1,700,319 | 1/1929 | Kjekstad | 285—286 |
| 2,307,148 | 1/1943 | McGuire | 285—286 X |
| 2,662,552 | 12/1953 | Rowe et al. | 138—178 |
| 2,816,323 | 12/1957 | Munger. | |
| 3,017,204 | 1/1962 | Smith | 285—286 X |
| 3,078,108 | 2/1963 | Smith | 285—286 X |

CARL W. TOMLIN, *Primary Examiner.*